United States Patent [19]

Donato et al.

[11] Patent Number: 5,226,339
[45] Date of Patent: Jul. 13, 1993

[54] TWO-SPEED TRANSMISSION FOR USE WITH ELECTRIC POWERED VEHICLE

[75] Inventors: John M. Donato, Canton, Mich.; John C. McCoy, Fayetteville, Tenn.; Robert S. McKee, Palatine; Ralph D. Salle, Lake Zurich, both of Ill.; Richard A. Bakowski, Warners, N.Y.

[73] Assignee: Chrysler Corporation, Highland Park, Mich.

[21] Appl. No.: 857,152

[22] Filed: Mar. 25, 1992

[51] Int. Cl.$^5$ .............................. F16H 3/08
[52] U.S. Cl. .................... 74/375; 475/206; 318/161; 192/0.02 R; 74/333; 74/411.5
[58] Field of Search ............... 74/411.5, 421 A, 333, 74/339, 360, 363, 375; 475/207, 206, 198; 192/0.02 R; 318/12, 13, 161; 310/74, 153, 92, 100

[56] References Cited

U.S. PATENT DOCUMENTS

| | | |
|---|---|---|
| 1,179,407 | 4/1916 | Decker . |
| 1,442,220 | 1/1923 | Kelly . |
| 1,794,613 | 3/1931 | Heany . |
| 2,405,636 | 8/1946 | Beck . |
| 2,604,175 | 7/1952 | Burdick et al. . |
| 2,917,122 | 12/1959 | Quisenberry . |
| 3,027,959 | 4/1962 | Mailliard . |
| 3,040,595 | 6/1962 | Osswald ........................ 74/333 |
| 3,115,047 | 12/1963 | Lunn et al. ................ 475/198 X |
| 3,173,303 | 3/1965 | Galaniak ........................ 74/375 |
| 3,861,485 | 1/1975 | Busch . |
| 3,994,182 | 11/1976 | Katayama ...................... 74/375 |
| 4,021,712 | 5/1977 | Ishihara et al. ........... 192/0.02 R X |
| 4,296,650 | 10/1981 | Kalns ............................. 475/140 |
| 4,297,906 | 11/1981 | Costello .......................... 74/375 X |
| 4,347,918 | 9/1982 | Bezencon et al. ............. 192/0.02 R |
| 4,388,977 | 6/1983 | Bader ............................... 310/74 X |
| 4,458,156 | 7/1984 | Maucher et al. ................ 310/74 X |
| 4,493,403 | 1/1985 | Takano et al. ................. 74/411.5 X |
| 4,576,261 | 3/1986 | Barr ............................... 74/411.5 X |
| 4,651,066 | 3/1987 | Gritter et al. ................... 318/161 X |
| 5,085,092 | 2/1992 | Koga ............................... 74/333 |

Primary Examiner—Richard M. Lorence
Assistant Examiner—Benjamin Levi
Attorney, Agent, or Firm—Edward P. Barthel

[57] ABSTRACT

A manual two-speed automotive transmission adapted to being driven by an electric motor. The transmission includes an input shaft assembly driven by the motor via its armature, a flywheel and a clutch, an input gear assembly axially aligned with and separated from the input shaft assembly, and a transfer shaft assembly parallel to the input assemblies. A two-gear speed reducer rotatably mounted on the transfer shaft assembly connects a fixed gear of the input shaft assembly to a fixed gear of the input gear assembly. Additional gears are rotatably mounted on the transfer shaft assembly and secured to the input gear assembly, such that a synchronizer assembly on the transfer shaft cooperates with the various gears to drive the transfer shaft and a final output gear mounted thereon at a low or high speed. Reverse is accomplished by reversing the electric motor.

24 Claims, 6 Drawing Sheets

HI — 8.42:1
LO — 16.84:1

RATIOS
2.08:1
1.04:1
1.45:1
1.45:1
3.85:1

RATIOS
2.095:1
1.030:1
2.044:1
3.846:1

TWO-SPEED TRANSMISSION FOR USE WITH ELECTRIC POWERED VEHICLE

TECHNICAL FIELD

This invention relates generally to manual transmissions and, more particularly, to manual transmissions adapted to being driven by electric motors.

BACKGROUND ART

While electric powered vehicles appeared from time-to-time, they have not heretofore reached their expected production potential. For example, Decker U.S. Pat. No. 1,179,407 issued in 1916, disclosing an electric truck including a transmission having aligned armature shaft 31, pocket shaft 19 and main shaft 18, and a counter shaft 22 parallel thereto. Two pinion gears are slidably mounted on the main shaft 18, while a third gear is secured thereon, and four pinion gears are secured to the shaft 22, one in mesh with the third gear. By sliding the two slidably mounted gears along the main shaft to selectively engage the third gear of the main shaft and three of the four gears of the countershaft, low, second, high and reverse speeds are attained.

Kelly U.S. Pat. No. 1,442,220 issued in 1923, disclosing an electric powered automotive vehicle, preferably a truck, including a transmission having parallel motor and rear wheel drive shafts. A pair of gears are keyed to the motor shaft, and a second pair of gears are rotatably mounted on the drive shaft and mesh with the first pair of gears. Clutch means are slidably keyed to the drive shaft intermediate the second pair of gears for establishing two drive speeds by selectively manually engaging the one or the other of the second pair of gears.

Heany U.S. Pat. No. 1,794,613 issued in 1931, disclosing a transmission system for automobiles and including a combination of electro-magnetic and mechanical clutches so arranged in connection with suitable gears as to give automatic change of speeds depending on the relative speed of driving means and driven member and torque requirements of the car, and also containing means of manually shifting into various forward and reverse speeds. The transmission includes a main drive shaft, a parallel countershaft and a short shaft supporting an idler gear. Three gears are mounted on a sleeve slidably keyed to the main shaft, and three gears are secured to the countershaft, one of which meshes with the idler gear. Selectively sliding the three sleeve-mounted gears in cooperation with two of the three gears of the countershaft and the idler gear produce low, second, and reverse speed ratios.

Busch U.S. Pat. No. 3,861,485 issued in 1975, disclosing an electric motor vehicle including a two-part transmission having an input shaft from a shunt-wound electric motor, a parallel final output shaft of an electric clutch, and a parallel output shaft to the drive wheels, an input gear on the input shaft, a meshing gear on the final output shaft, along with ring, planet and sun gears on the latter connected by a unidirectional clutch to a separately mounted gear which meshes with a gear carried on the electric clutch shaft. Variable-pitch pulleys on the input and the electric clutch shafts are interconnected by a V-belt. At low speeds the electric motor is connected via the variable-pitch pulleys and V-belt to the wheels, and for higher speeds the motor is connected thereto via the above referenced gearing. Reverse is effected by reversing the motor electrically.

DISCLOSURE OF THE INVENTION

A general object of the invention is to provide an improved, simplified, efficient transmission with minimal gear noise, for use with a high speed electric motor.

Another object of the invention is to provide an improved high and low speed transmission for use with an electric motor, with reverse provided by reversing the electric motor.

A further object of the invention is to provide a transmission including an input shaft assembly driven by an electric motor, an input gear assembly axially aligned with and separated from the input shaft assembly and including at least two gears in mesh with gears rotatably mounted on a transfer shaft assembly having an axis parallel to the axes of the input shaft assembly and the input gear assembly, speed reducer means operatively interconnecting the three assemblies, and a synchronizer assembly slidably mounted on the transfer shaft assembly and adapted to being selectively slid into operative engagement with respective gears on the transfer shaft to rotate the transfer shaft at high or low speed.

A still further object of the invention is to provide a transmission for use with a high speed electric motor wherein a speed reducer including two interconnected and different size gears rotatably mounted on a transfer shaft interconnects two split apart shafts, and is adapted to drive the transfer shaft at high speed upon engagement by a synchronizer assembly mounted on the transfer shaft.

Still another object of the invention is to provide an alternate embodiment of the transmission including an input shaft adapted to being driven by an electric motor, an input gear secured to the input shaft, a second shaft axially aligned with and split from the input shaft, three spaced-apart gears fixedly secured to the second shaft, a transfer shaft parallel to the input and second shafts, a speed reducer assembly rotatably mounted on the transfer shaft and including a pair of different size gears, one of which is in mesh with the input gear and the other of which is in mesh with one of the three spaced-apart gears to drive the second shaft, high and low gears rotatably mounted on the transfer shaft and in mesh, respectively, with the second and third of the three spaced apart gears, a synchronizer assembly slidably secured to the transfer shaft intermediate the high and low gears for selectively connecting one of the high or low gears to the transfer shaft to rotate same at one of a predetermined high or low speed, and a final drive gear fixedly secured to the transfer shaft for rotation therewith.

These and other objects and advantages of the invention will become more apparent when reference is made to the following drawings and the accompanying description.

BRIEF DESCRIPTION OF THE DRAWINGS

FIG. 6 is a view taken along the plane of the line 6—6 of FIG. 5, and looking in the direction of the arrows;

FIG. 9 is a schematic illustration of an alternate two-speed transmission cooperating with an electric motor.

BEST MODE OF CARRYING OUT THE INVENTION

Figure 1:
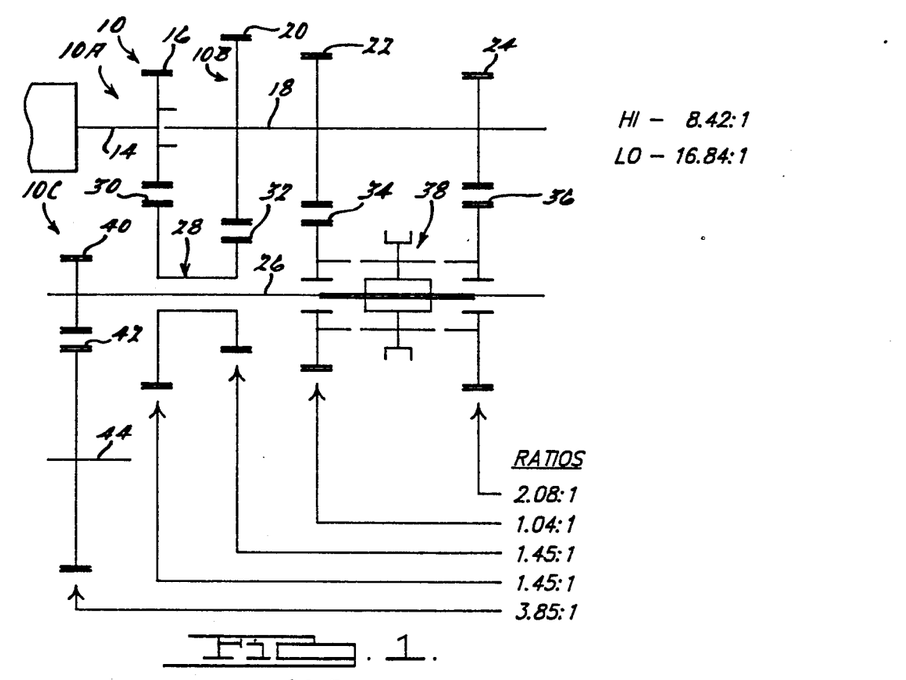
FIG. 1 is a schematic illustration of a two-speed transmission cooperating with an electric motor.

Referring now to the drawings in greater detail, FIG. 1 is a schematic illustration of a vehicular two-speed transmission 10 adapted to being electrically actuated by a suitable high speed electric motor, such as an 8000 RPM DC traction drive motor 12, but which may be a higher speed AC motor. The transmission 10 includes generally an input shaft assembly 10A, an input gear assembly 10B axially aligned with the assembly 10A, and a transfer shaft assembly 10C parallel to the assemblies 10A and 10B.

The input shaft assembly 10A includes an input shaft 14 driven by the motor 12 and having a gear 16 fixedly mounted on the distal end thereof. The input gear assembly 10B includes an output shaft 18 having three spaced apart gears 20, 22 and 24 fixedly secured thereon. The transfer shaft assembly 10C includes a transfer shaft 26 having a speed reducer assembly 28 comprising two interconnected gears 30 and 32 rotatably mounted thereon, a high gear 34 and a low gear 36 also rotatably mounted thereon, a final drive gear 40 secured thereon, and a synchronizer assembly 38 secured thereon intermediate the gears 34 and 36.

The gear 16 is in mesh with the gear 30 of the speed reducer assembly 28 rotatably mounted around the transfer shaft 26 at a predetermined ratio of, say, 1.45 to 1. The other gear 32 of the speed reducer assembly 28 meshes with the gear 20 fixedly mounted on the shaft 18 at a predetermined ratio of, say, 1.45 to 1. The shaft 18 is aligned with and split apart from the input shaft 14.

The gears 22 and 24 are in mesh with the high gear 34 and the low gear 36, respectively. The gears 22 and 34 provide a predetermined high gear ratio of, say, 1.04 to 1, and the gears 24 and 36 provide a predetermined low gear ratio of, say, 2.08 to 1. The synchronizer assembly 38 mounted on the transfer shaft 26 intermediate the high gear 34 and the low gear 36, effectuates either the high or the low gear ratio by operatively connecting either the high gear 34 or the low gear 36 to the shaft 26 to drive same.

The final drive gear 40 is mounted on the shaft 26 in front of the gear 30, and is in mesh with a differential drive gear 42, operatively connected to an output device 44, at a predetermined ratio of, say, 3.85 to 1.

The power flow end result is a predetermined overall high ratio, e.g., 8.42 to 1, or a predetermined overall low ratio, e.g., 16.84 to 1. For an 8000 RPM input to the shaft 14, the speed of the shaft 18 is on the order of 3820 RPM and the resultant high speed of the shaft 26 is on the order of 3690 RPM and the resultant low speed of the shaft 26 is on the order of 1840 RPM.

Figure 2:
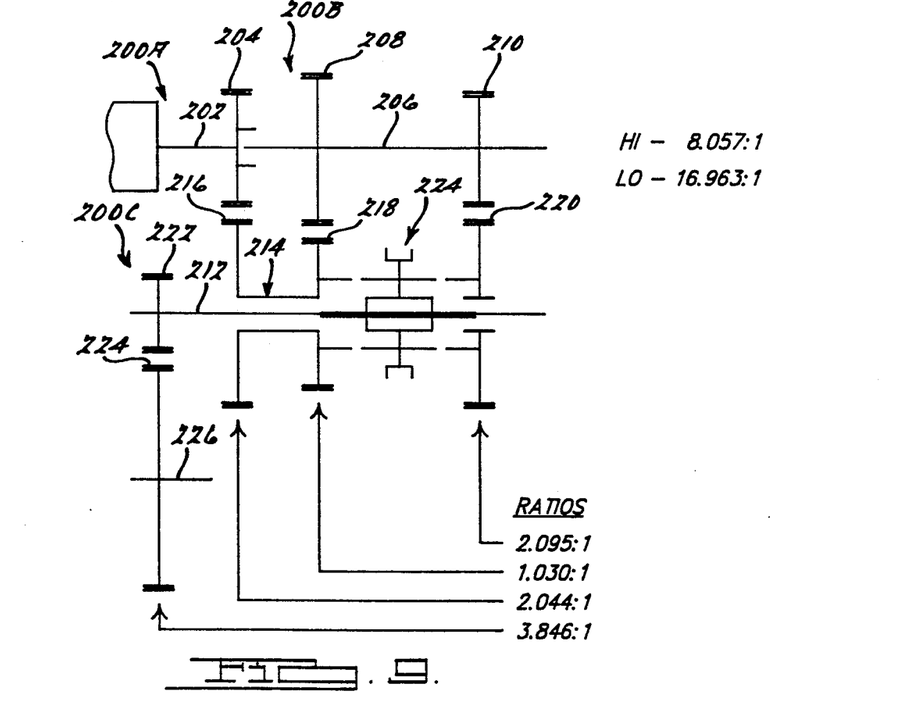
FIG. 2 is a side elevational view in partial cross-section of a transmission embodying the invention and defining the FIG. 1 schematic.
Figure 3:
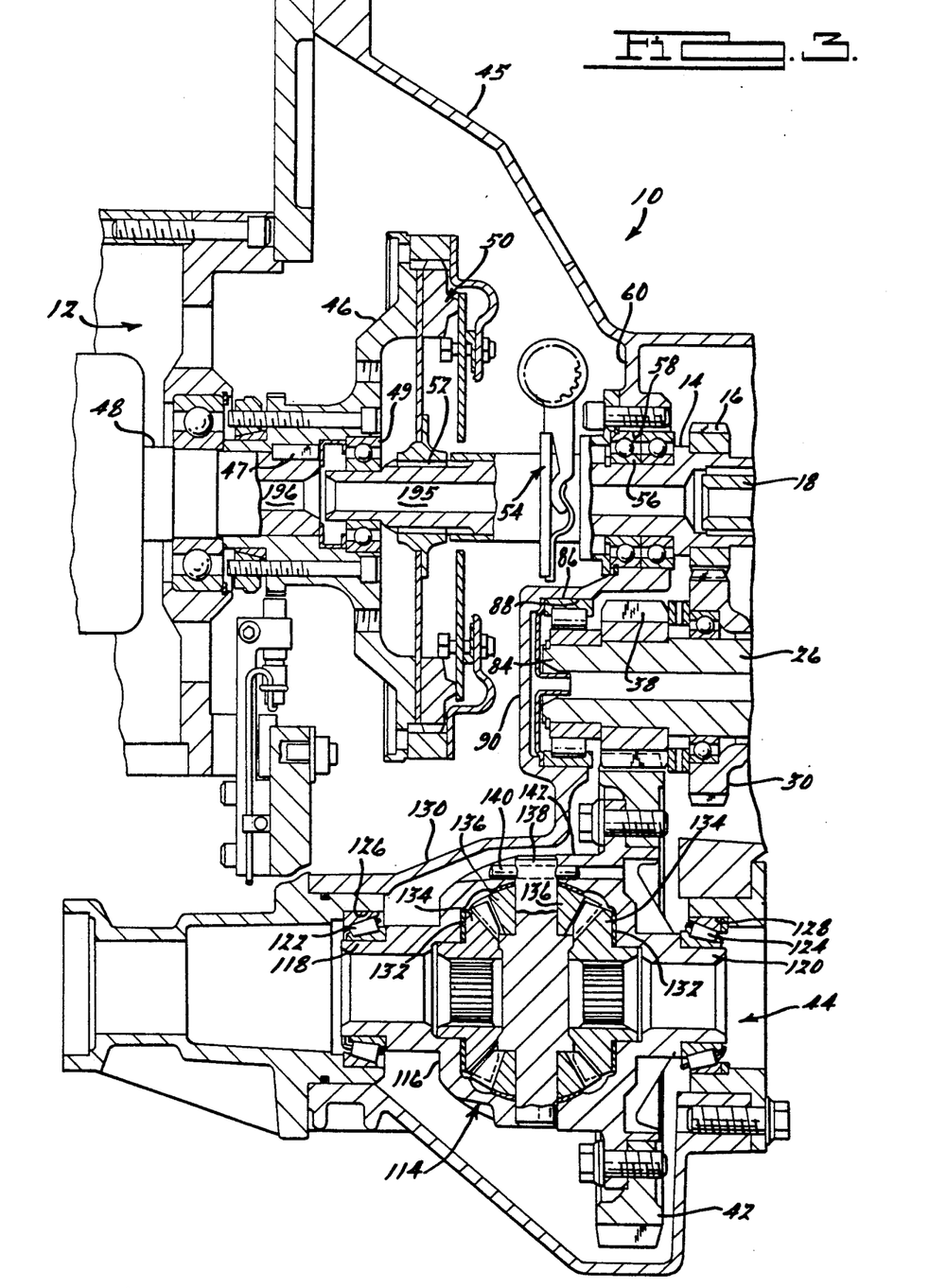
FIG. 3 is an enlarged cross-sectional view of a portion of the FIG. 2 structure, taken along the plane of the line 3—3 of FIG. 2, and looking in the direction of the arrows.
Figure 4:
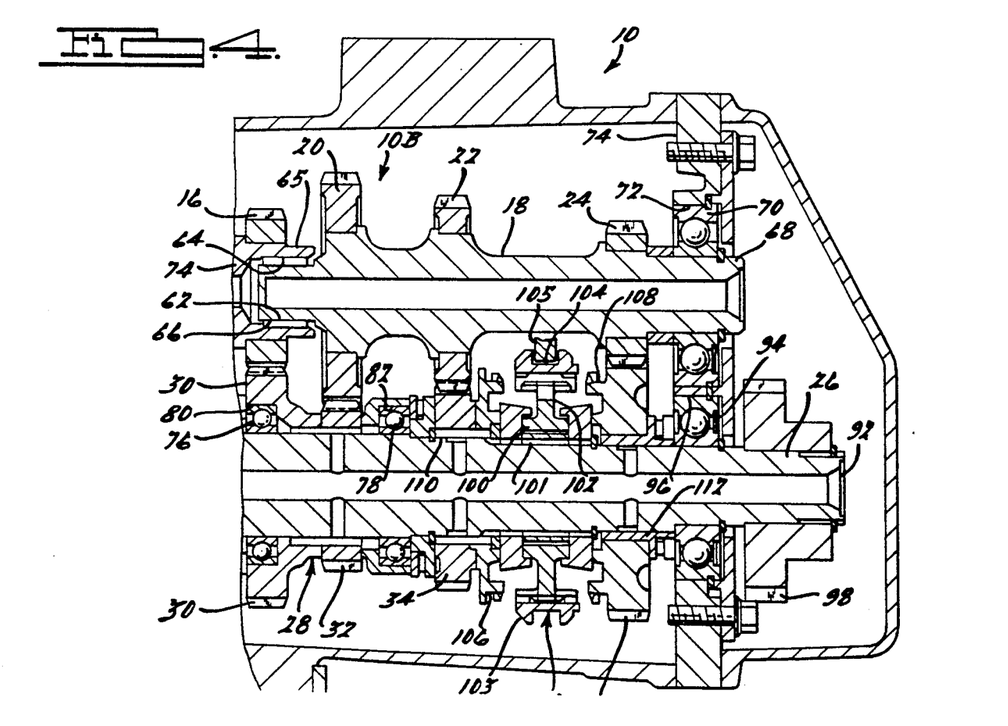
FIG. 4 is an enlarged cross-sectional view of the remaining portion of the FIG. 2 structure, taken along the plane of the line 4—4 of FIG. 2, and looking in the direction of the arrows.

Referring now to FIGS. 2–4, the structure for the FIG. 1 schematic will be described. The transmission 10 includes a housing 45 enclosing a flywheel 46 connected by a key way or splines 47 to the armature 48 of the electric motor 12 and rotatably mounted on the input shaft 14 by bearings 49. A conventional clutch assembly 50 is secured adjacent the flywheel 46 to the input shaft 14 by splines 52. A clutch release bearing 54 is mounted on the shaft 14 adjacent the clutch assembly 50. The input shaft 14 is rotatably mounted within bearings 56 confined within an opening 58 formed in an inner wall 60 of the housing 45.

As shown in FIGS. 2 and 4, the split between the input shaft 14 and the output shaft 18 is accomplished by means of a bearing 62 mounted between an opening 64 formed in the distal end 65 of the input shaft 14 and a reduced diameter end portion 66 of the output shaft 18. The other end 68 of the shaft 18 is rotatably mounted within bearings 70 (FIG. 4) confined within an opening 72 formed in a second inner wall 74 of the housing 45. The gears 20, 22 and 24 are shown in FIG. 4 as secured to the shaft 18.

As further shown in FIG. 4, the speed reducer assembly 28, including the gears 30 and 32, is rotatably mounted on the transfer shaft 26 by a pair of bearings 76 and 78 mounted within respective recesses 80 and 82 formed in the opposite ends of the assembly 28.

The transfer shaft 26 is supported at one end 84 thereof in a bearing 86 (FIG. 3) mounted in a pocket 88 formed in the housing 45 as an extension 90 of the inner wall 60, and supported adjacent the other end 92 thereof in a bearing 94 confined within a second opening 96 formed in the second inner wall 74 of the housing 45. A gear 98 for parking lock is secured to the end 92 of the shaft 26 beyond the inner wall 74 and within the housing 45.

The synchronizer assembly 38 is shown in FIG. 4 as including an inner sleeve member 100 secured by splines 101 to the shaft 26 and a support flange 102 extending radially from the sleeve member 100. An annular connector drive member 103 is slidably mounted on the outer peripheral end of the support flange 102, adapted to being slid left or right in FIG. 4 via an annular notch 104 by a shift fork 105 (see FIG. 7), to alternately engage either a drive unit 106 secured to a side of the high gear 34, or a drive unit 108 secured to a side of the low gear 36, to thereby rotate the transfer shaft 26 at either the predetermined high speed or low speed for rotating the final drive gear 38 accordingly.

The high gear 34 and its associated drive unit 106 are rotatably mounted on the shaft 26 by a bushing or bearing 110, and the low gear 36 and its associated drive unit 108 are rotatably mounted on the shaft 26 by a bushing or bearing 112.

As shown in FIG. 3, the output device 44 includes a differential assembly 114 including a housing 116 having end portions 118 and 120 rotatably mounted in respective bearings 122 and 124 mounted within openings 126 and 128 formed in an extended portion 130 of the housing 45. The differential drive gear 42 is secured to the housing 116. Oppositely disposed bushings 132 are formed within the housing 116 adjacent oppositely disposed pinion gears 134. The pinion gears 134 mesh with gears 136 formed on a rod member 138 secured by pins 140 to the housing 116. The differential assembly 114 thus serves to drive the vehicular wheels (not shown).

No reverse gear is required in the transmission 10 inasmuch as reverse is accomplished by reversing the electric motor 12.

Figure 5:
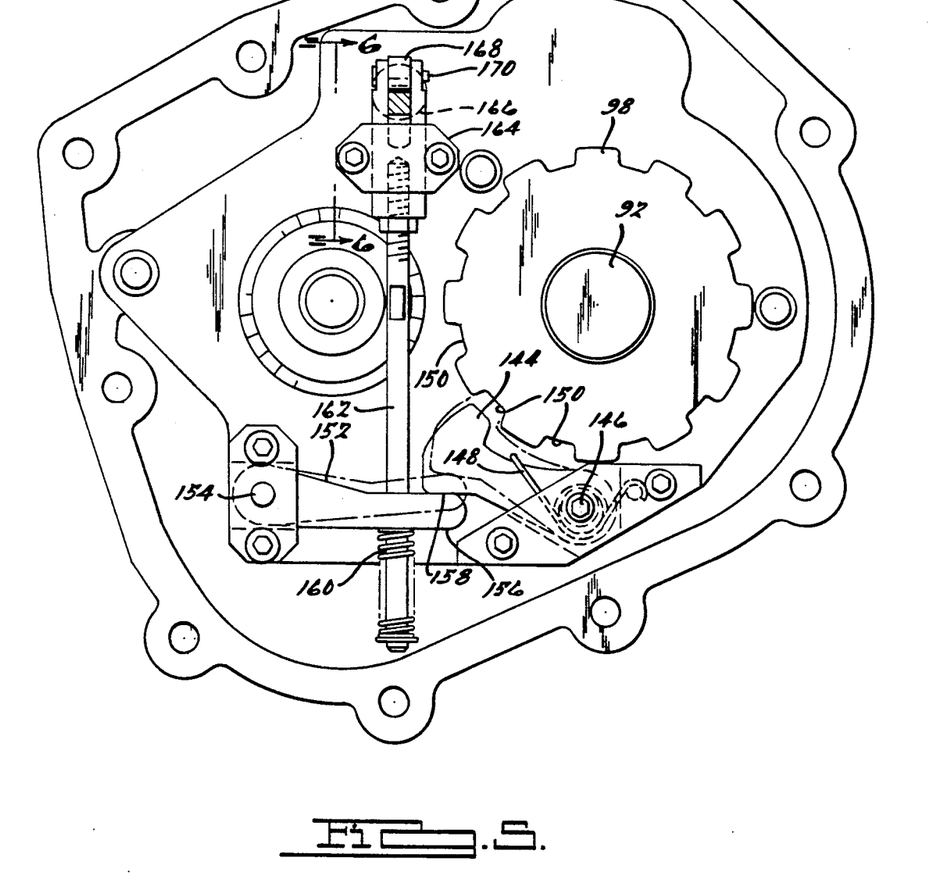
FIG. 5 is an end view of the parking lock structure embodied in the transmission.

Referring now to FIG. 5, the parking lock gear 98 on the end 92 of the shaft 26 is adapted to being selectively locked by a latch 144 pivotally mounted on a fixed pivot pin 146. The latch 144 is spring loaded by a torsion spring 148 to normally remain spaced apart form the teeth 150 of the gear 98 until urged by a lever member 152 against the force of the spring 148. The lever member 152 is pivotally mounted on a fixed pivot pin 154, with its distal end 156 abutted against the distal end 158 of the latch 144, so as to be normally urged by the spring 148 through the lever member 152 downwardly in FIG. 5 against the force of a spring 160 mounted around a rod member 162. The rod member 162 is adapted to being reciprocally moved through a fixed guide member 164 by a parking shift rod 166, to thereby effectuate the locking and unlocking of the latch 144 with the parking lock gear 98. As shown in FIG. 6, a roller 168 is rotatably mounted on a fixed pin 170. The shift rod 166 includes a recess 172 formed adjacent the end thereof, in which the roller 168 is seated. A ramp 174 extends from the recess 172, to a flat segment 176.

When the shift rod 166 is moved to the right in FIG. 6, the roller 168 is caused to roll up the ramp 174 to the flat segment 176, thereby causing the rod member 162 to lift, raising the lever member 152 and, hence, forcing the latch 144 into a tooth 150 of the parking lock gear 98, to lock same.

Figures 7, 7A, 8:
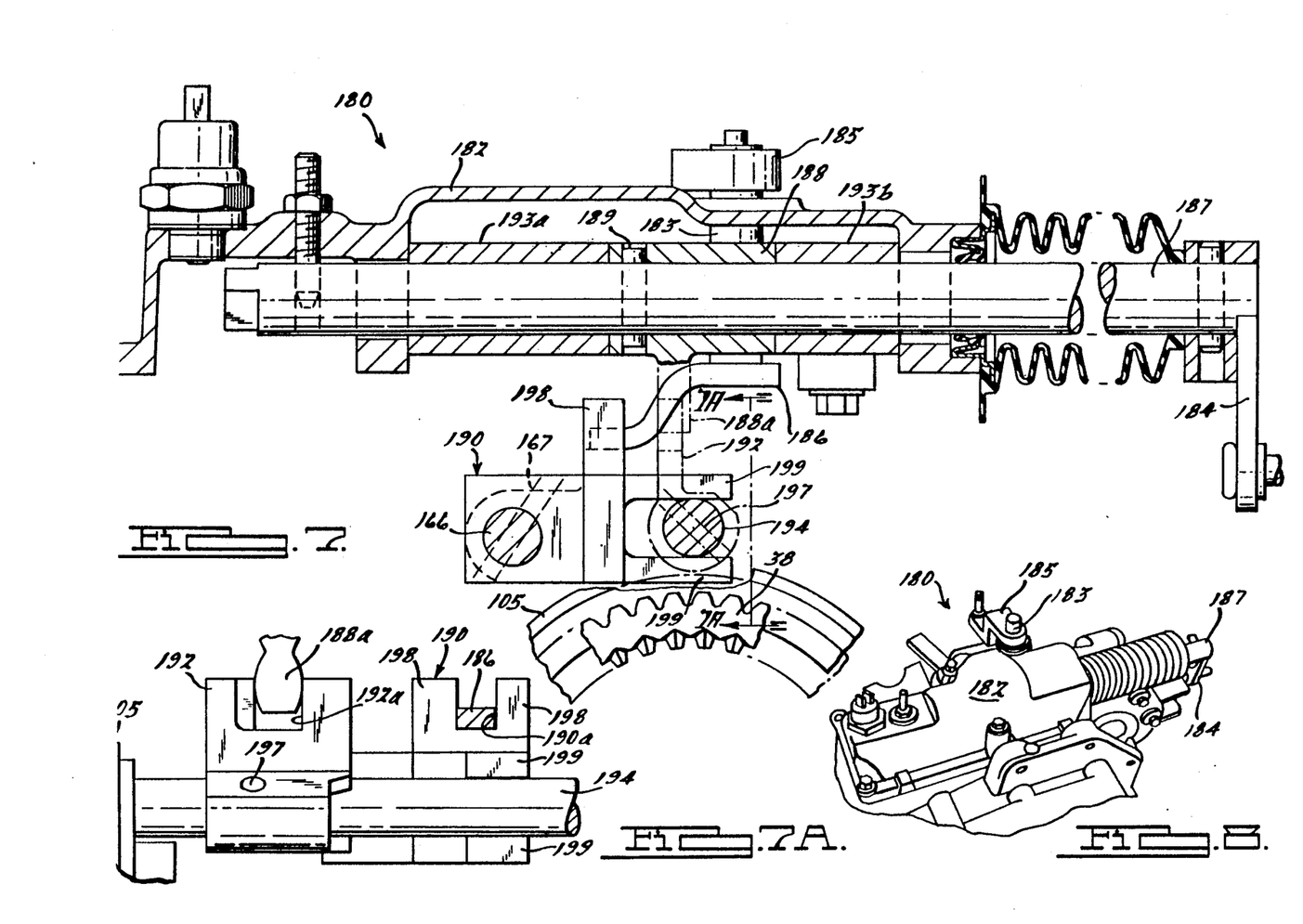
FIG. 7 is a cross-sectional view of a shift control mechanism for use with the transmission.
FIG. 7A is an end view taken along the plane of the line 7A—7A of FIG. 7, and looking in the direction of the arrows.
FIG. 8 is a plan view taken along the plane of the line 8—8 of FIG. 7, and looking in the direction of the arrows.

Referring now to FIG. 7 and 8, a shift control assembly 180 is adapted to being mounted on top of the transmission 10. The assembly 180 includes a housing 182 having a rotatably mounted select lever 184 and a rotatably mounted park lever 185 extending therefrom. Typically, flexible cables (not shown) extend between the levers 184 and 185 and a manual shift lever (not shown), or may be actuated by electronic means (not shown) for an automatic shift arrangement.

The select lever 184 rotates a select shaft 187 which extends into the housing 182 to actuate a selector mechanism 188 fixedly mounted around the shaft 187. The park lever 185 is connected directly to the extended end of a shaft 183. The park lever 185 serves, through the shaft 183 and a link 186 fixed thereto and extended into a recess 190a of a lug member 190 to move the latter laterally, to engage "park", as will be explained.

The selector mechanism 188 is secured by a pin 189 to the shaft 187 and includes a rounded extension 188a rotatably positioned in a recess 192a of a shift rail lug member 192. Bushings 193a and 193b laterally retain the selector mechanism 188 within the housing 182, allowing the selector mechanism to rotate therebetween. The lug member 192 is fixedly secured around a 1-2 shift rod 194 by a pin 197. The rail lug member 190 is secured to the parking shift rod 166 by a pin 167. The lug member 190 is shifted by the park lever 185, causing the parking shift rod 166 to move as described above to effectuate locking the vehicle in park, or, alternately, the lug member 192 is shifted by the select lever 184, causing the 1-2 shift rod 194 to move fore or aft. The lug member 190 includes spaced fingers 198 for straddling the distal end of the link 186 to be moved laterally by the latter, and spaced fingers 199 for straddling the shift rod 194 to prevent any rotation of the lug member 190.

As further shown in FIG. 7, the shift fork 105 is secured to the 1-2 shift rod 194 and, as such, is moved by the select lever 184, either to the left in FIG. 4 to actuate the high gear 34, or to the right to actuate low gear 36.

The transmission 10 is lubricated by lubrication passing through a center passage 195 (FIG. 3) formed through the input shaft 14. The lubricant is circulated from the passage 194 throughout the transmission 10 by an external pump (not shown) from a remote reservoir and cooler. The lubricant also serves as the cooling medium for the electric motor armature 48 via a center passage 196 formed through the armature 48.

Figures 8, 10:
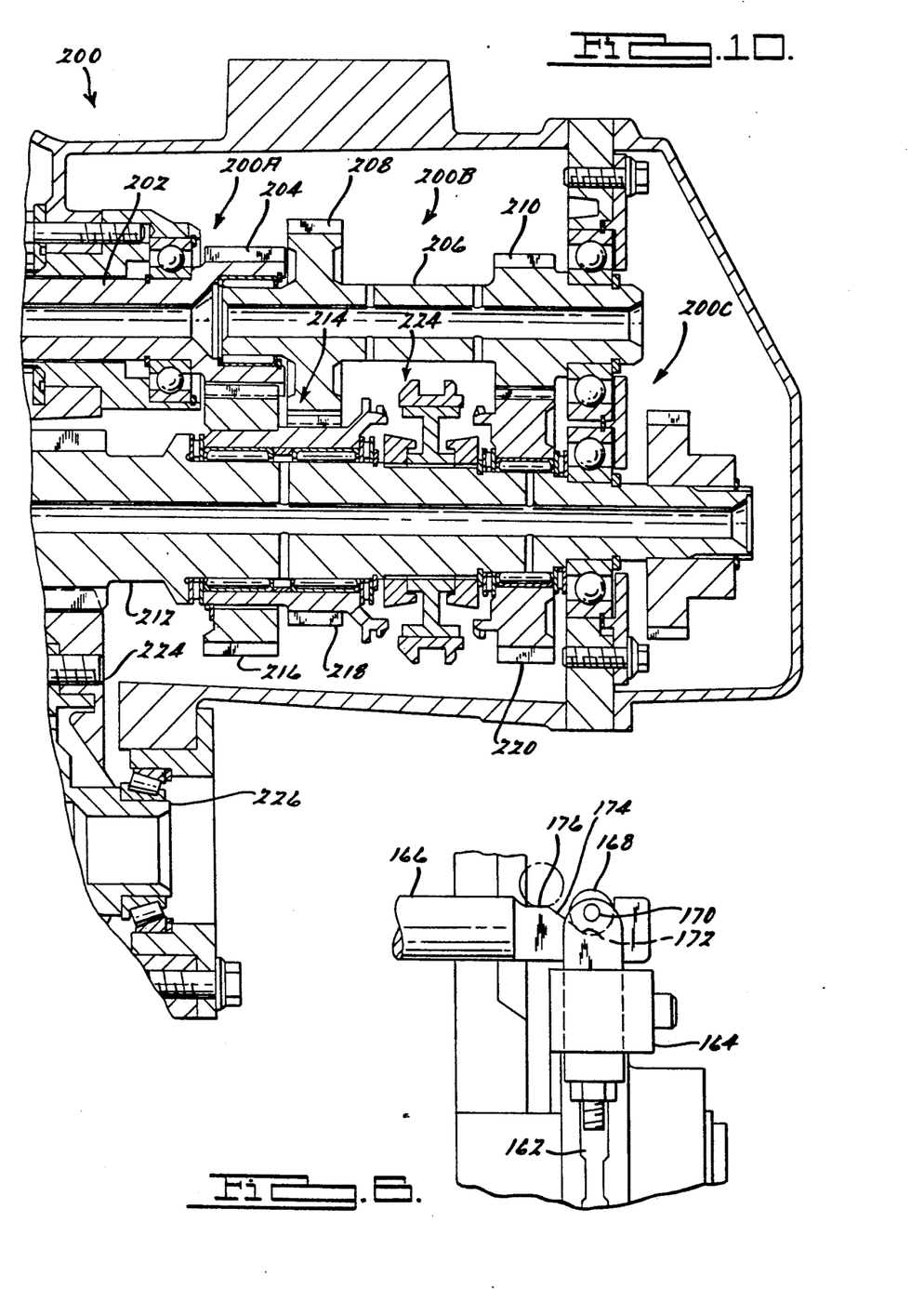
FIG. 10 is a side elevational view in partial cross-section defining the FIG. 9 schematic.

Referring now to FIG. 9 and 10, a vehicular two-speed transmission 200 is adapted to being electrically actuated by a suitable high speed electric motor, as is the case with the transmission 10. The transmission 200 includes generally an input shaft assembly 200A, an input gear assembly 200B axially aligned with the assembly 200A, and a transfer shaft assembly 200C parallel to the assemblies 200A and 200B.

The input shaft assembly 200A includes an input shaft 202 driven by the motor 12 and having a gear 204 fixedly mounted on the distal end thereof. The input gear assembly 200B includes a shaft 206 having two spaced apart gears 208 and 210 fixedly secured thereon. The transfer shaft assembly 200C includes a shaft 212 having a speed reducer assembly 214 comprising two interconnected gears 216 and 218 rotatably mounted thereon and serving as a high gear, and a low gear 220 also rotatably mounted thereon, a final drive gear 222 secured thereon, and a synchronizer assembly 224 secured thereon intermediate the gears 218 and 220.

The gear 204 is in mesh with the gear 216 of the speed reducer assembly 214 rotatably mounted around the transfer shaft 212 at a predetermined ratio of, say, 2.044 to 1. The other gear 218 of the speed reducer assembly 214 meshes with the gear 208 fixedly mounted on the shaft 206 at a predetermined ratio of, say, 1.030 to 1. The shaft 206 is aligned with and split apart from the input shaft 202.

The gear 210 is in mesh with the low gear 220, and provides a predetermined low gear ratio of, say, 2.095 to 1. The synchronizer assembly 224 mounted on the transfer shaft 212 intermediate the gear 218 of the speed reducer assembly 214 and the low gear 220, effectuates either the high or the low gear ratio by operatively connecting either the assembly 214 or the low gear 220, respectively, to the shaft 212 to drive same.

The final drive gear 222 is mounted ont the shaft 212 in front of the gear 216, and is in mesh with a differential drive gear 224, operatively connected to an output device 226, at a predetermined ratio of, say, 3.846 to 1. The power flow end result is a predetermined overall high ratio, e.g., 8.057 to 1, or a predetermined overall low ratio, e.g., 16.963 to 1. For an 8000 RPM input to the shaft 202, the speed of the shaft 206 is on the order of 3805 RPM and the resultant high speed of the shaft 212 is on the order of 3660 RPM and the resultant low speed of the shaft 212 is on the order of 1830 RPM.

Referring now to FIG. 10, the components for the FIG. 9 schematic which are similar to the FIG. 3 structure bear the same reference numerals

INDUSTRIAL APPLICABILITY

It should be apparent that the invention provides a two-speed transmission adaptable to being driven by a high speed electric motor by virtue of the inclusion of a speed reducer and an input gear assembly split apart from an input shaft assembly.

While but two embodiments of the invention have been shown and described, other modifications thereof are possible within the scope of the following claims.

The embodiment of the invention in which an exclusive property or privilege is claimed are defined as follows:

1. A transmission for use with a high speed electric power source, said transmission comprising an input shaft, clutch means for selectively operatively connecting said input shaft to said electric power source, an input gear secured to said input shaft, a second shaft aligned with and separated from said input shaft, at least one gear fixedly secured to said second shaft, a transfer shaft parallel to said input and second shaft, speed reducer means rotatably mounted on said transfer shaft and operatively interconnecting said input and second shafts, a first gear rotatably mounted on said transfer shaft and meshing with said at least one gear on said second shaft, a synchronizer assembly slidably secured to said transfer shaft and adapted to engage said first gear to rotate said transfer shaft at a first speed, and to cooperate with said speed reducer means to rotate said transfer shaft at a second speed, and a final drive gear secured to said transfer shaft for rotation therewith.

2. A transmission for use with an electric motor having an armature, a flywheel secured to the armature, and a clutch assembly operatively connected to the flywheel, said transmission comprising an input shaft aligned with an selectively secured to the armature by said clutch assembly, an input gear secured to said input shaft, a second shaft aligned with and separated from said input shaft, a first pair of spaced-apart gears fixedly secured to said second shaft, a transfer shaft parallel to said input and second shafts, a speed reducer rotatably mounted on said transfer shaft and including a second pair of spaced interconnected gears of different sizes serving as a second gear, one of which meshes with said input gear on said input shaft and the other of which meshes with one of said first pair of gears on second shaft, a first gear rotatably mounted on said transfer shaft and meshing with the other of said pair of gears on said second shaft, a synchronizer assembly secured to said transfer shaft intermediate said second and first gears and adapted to being slidably moved on said transfer shaft to selectively secure one of the second and first gears to said transfer shaft to rotate same at predetermined second or first speeds, and a final drive gear secured to said transfer shaft for rotation therewith.

3. The transmission described in claim 2, and a differential drive gear in mesh with said final drive gear.

4. The transmission described in claim 2, wherein the gear ratio of the input gear and the one of said second pair of gears is on the order of 2.044 to 1.

5. The transmission described in claim 2, wherein the gear ratio of said other of said second pair of gears and said one of said first pair of gears is on the order of 1.030 to 1.

6. The transmission described in claim 2, wherein the gear ratio of the one of said first pair of gears and said first gear is on the order of 2.095 to 1.

7. The transmission described in claim 3, wherein the gear ratio of said final drive gear and said differential drive gear is on the order 3.846 to 1.

8. The transmission described in claim 2, and a parking lock gear fixedly secured to an end of said transfer shaft.

9. The transmission described in claim 3, wherein the overall high speed reduction thereof between input and output is a ratio on the order of 8.057 to 1.

10. The transmission described in claim 3, wherein the overall low speed reduction thereof between input and output is a ratio of on the order of 16.963 to 1.

11. The transmission described in claim 3, and a differential output assembly operatively connected to said differential drive gear.

12. The transmission described in claim 2, wherein reverse output thereof is accomplished by reversing said electric motor.

13. A transmission for use with an electric motor having an armature, a flywheel secured to the armature, and a clutch assembly operatively connected to the flywheel, said transmission comprising an input shaft aligned with and selectively secured to the armature by said clutch assembly, an input gear secured to said input shaft, a second shaft aligned with and separated from said input shaft, three spaced-apart gears fixedly secured to said second shaft, a transfer shaft parallel to said input and second shafts, a speed reducer rotatably mounted on said transfer shaft and including a pair of interconnected gears of different sizes, one of which meshes with said input gear and the other of which meshes with one of said three gears, a second gear rotatably mounted on said transfer shaft and meshing with another of said three gears, a first gear rotatably mounted on said transfer shaft and meshing with said third of said three gears, a synchronizer assembly secured to said transfer shaft intermediate said second and first gears and adapted to being slidably moved on said transfer shaft to selectively secure one of the second and first gears to said transfer shaft to rotate same at predetermined second or first speeds, and a final drive gear secured to said transfer shaft for rotation therewith.

14. The transmission described in claim 13, and a differential drive gear in mesh with said final drive gear.

15. The transmission described in claim 13, wherein the gear ratio of the input gear and the one of said pair of gears is on the order 1.45 to 1.

16. The transmission described in claim 13, wherein the gear ratio of one of said pair of gears and one of said three gears is on the order of 1.45 to 1.

17. The transmission described in claim 13, wherein the gear ratio of one of said three gears and said second gear is on the order of 1.04 to 1.

18. The transmission described in claim 13, wherein the gear ratio of one of said three gears and said first gear is on the order 2.08 to 1.

19. The transmission described in claim 14, wherein the gear ratio of said final drive gear and said differential drive gear is on the order of 3.85 to 1.

20. The transmission described in claim 13, and a parking lock gear fixedly secured to an end of said transfer shaft.

21. The transmission described in claim 14, wherein the overall high speed reduction thereof between input and output is a ratio on the order of 8.42 to 1.

22. The transmission described in claim 14, wherein the overall low speed reduction thereof between input and output is a ratio on the order of 16.84 to 1.

23. The transmission described in claim 14, and a differential output assembly operatively connected to said differential drive gear.

24. The transmission described in claim 13, wherein reverse output thereof is accomplished by reversing said electric motor.

* * * * *

UNITED STATES PATENT AND TRADEMARK OFFICE
CERTIFICATE OF CORRECTION

PATENT NO. : 5,226,339
DATED : July 13, 1993
INVENTOR(S) : John M. Donato et. al.

It is certified that error appears in the above-identified patent and that said Letters Patent is hereby corrected as shown below:

On the title page:
Add Assignee jointly with Chrysler -- New Venture Gear --.

Signed and Sealed this

Twenty-third Day of August, 1994

Attest:

BRUCE LEHMAN

Attesting Officer        Commissioner of Patents and Trademarks